United States Patent
Stewart et al.

[11] 4,191,511
[45] Mar. 4, 1980

[54] COMPRESSOR CONTROL

[75] Inventors: William S. Stewart; James W. Hobbs, both of Bartlesville, Okla.

[73] Assignee: Phillips Petroleum Company, Bartlesville, Okla.

[21] Appl. No.: 708,965

[22] Filed: Jul. 26, 1976

[51] Int. Cl.² ............................................. F04B 49/00
[52] U.S. Cl. ........................................ 417/18; 417/43; 417/26
[58] Field of Search ..................... 417/20, 21, 42, 47, 417/26–28; 137/100

[56] References Cited

U.S. PATENT DOCUMENTS

| | | | |
|---|---|---|---|
| 1,160,562 | 11/1915 | Banner | 417/20 |
| 1,210,030 | 12/1916 | Baumann | 417/3 |
| 2,601,849 | 7/1952 | Lee | 137/99 |
| 3,092,127 | 6/1963 | Bracken | 137/100 |
| 3,292,846 | 12/1966 | Harder | 417/43 |
| 3,362,626 | 1/1968 | Schlirf | 417/26 |
| 3,380,650 | 4/1968 | Drummond | 417/295 |
| 3,891,344 | 6/1975 | Braytenbah | 415/1 |
| 3,994,623 | 11/1976 | Ruthstein | 417/20 |

FOREIGN PATENT DOCUMENTS 915544  1/1960  United Kingdom ...................... 417/43

*Primary Examiner*—William L. Freeh

[57] ABSTRACT

Control of the main gas stream from a compressor is accomplished by automatically adjusting the amount of gas vented from the compressor output by a variable relief valve or other flow restriction means, with the speed of the compressor being automatically adjusted to maintain the compressor output at a level permitting effective control within the useful range of the venting system. In a preferred embodiment, the amount by which the position of the means used to restrict flow through the vent conduit departs from a desired operating range is used to generate a compressor acceleration signal which is in turn used to generate a compressor speed set point signal from which the compressor speed is controlled.

16 Claims, 1 Drawing Figure

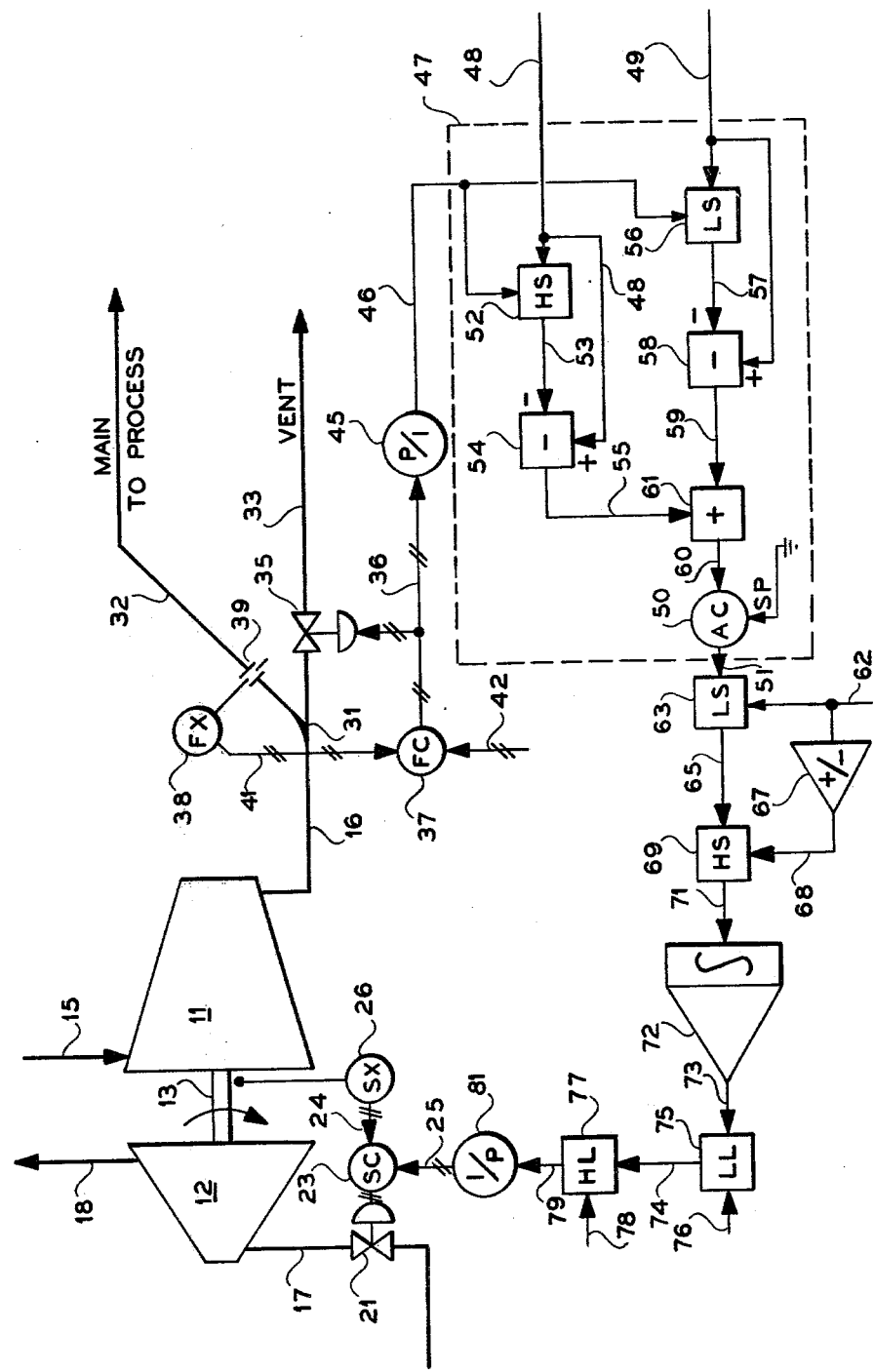

COMPRESSOR CONTROL

This invention relates to a method and apparatus for control of a compressor. In another aspect the invention relates to a method and apparatus for controlling the flow rate of gas through a main conduit from a compressor. In yet another aspect the invention relates to a method and apparatus for maintaining the output of a compressor at a level permitting venting of a portion of the compressor output to regulate flow through a main compressor output conduit. In still another aspect the invention relates to a method and apparatus for generating a compressor acceleration signal in response to the magnitude and direction by which the position of a flow control element departs from a desired control position or position range.

In many processes it is desirable to provide a carefully controlled flow of some kind of gaseous material to one or more locations associated with the process. Since the equipment used to provide relatively large quantities of pressurized air or other gas is ordinarily quite large and heavy, such equipment is ordinarily not subject to control which would make it responsive to relatively short-term variations in the amount or pressure of gas to be provided. It is therefore desirable to operate large compressors and blowers to provide slightly more compressed gas than is required by the associated process and to use a more responsive venting or relief valve arrangement to release the excess gas flow or pressure so that the desired pressure or flow to the process is maintained. While a compressor can be operated at a preselected constant speed with the output of the compressor being regulated over a relatively narrow range to provide compressed gas to a process which has a substantially constant gas pressure or flow requirement, providing the required flow or pressure to a process which has varying requirements requires continuously operating the compressor at a rate sufficient to provide the maximum amount of compressed gas which will be needed, along with increasing the range of control which can be exercised by the vent or relief valve control system, thereby using a substantial amount of unnecessary energy in operating the compressor as well as increasing the cost and reducing the responsiveness of the vent control system because of the larger equipment and capacity needed to provide the desired range of vent control.

Accordingly, it is an object of the invention to provide a method and apparatus for control of a compressor. Another object of the invention is to provide a method and apparatus for controlling the flow rate of gas through a main conduit from a compressor. Yet another object of the invention is to provide a method and apparatus for maintaining the output of a compressor at a level permitting venting of a portion of the compressor output to regulate flow through a main compressor output conduit. Still another object of the invention is to provide a method and apparatus for generating a compressor acceleration signal in response to the magnitude and direction by which the position of a flow control element departs from a desired control position or position range.

In accordance with the invention a method and apparatus are provided whereby the position of a flow restriction means or relief valve in a vent conduit is sensed, and, in response to the position of the valve or flow restriction being outside a predetermined control range, the speed of the compressor is automatically adjusted to insure that the output of the compressor is maintained sufficiently close to the pressure or flow required by the process to permit operable control by the venting system. In a presently preferred embodiment of the invention a compressor acceleration signal is generated in response to the magnitude and direction of the departure of the vent flow restriction means from a preselected position or range of positions. Suitable use of the compressor acceleration signal, such as integration to provide a compressor speed set point signal, can then be utilized in controlling the speed of the compressor.

The term "compressor" as used herein is intended to define a broad range of means for providing flow impetus to gaseous fluids and is considered to include both high pressure devices commonly referred to as compressors and lower pressure devices more often referred to as blowers and is considered to include all types and classes of such devices. The term "relief valve" as used herein is considered to include any suitable valve which can be used to selectively vary the resistance to flow through a vent conduit and includes any suitable variable flow restriction means. The terms "acceleration" and "compressor acceleration signal" are considered to include negative acceleration or deceleration, with the term acceleration being used herein to define a vector quantity having both magnitude and direction.

Other objects and advantages of the invention will be apparent to those skilled in the art from the description of the invention and the appended claims thereto as well as from the drawing in which the sole FIGURE is a schematic representation of a preferred embodiment of the invention illustrating control of a compressor in accordance with the invention.

Referring to the drawing, there is illustrated a compressor 11 powered by a suitable engine or drive means such as a turbine 12, the compressor 11 being connected to the source of power by any suitable means such as a rotating drive shaft 13. The compressor 11 is adapted to draw gas from a compressor inlet conduit 15 and deliver gas at a higher pressure to a compressor outlet conduit 16. The speed of the compressor 11 and turbine 12 is determined by the amount of drive fluid, such as steam, provided to the turbine 12 through conduit means 17 and exiting the turbine through turbine exhaust conduit 18. A throttle valve means 21 located within the conduit means 17 is provided for controlling the flow of drive fluid to the turbine 12. It will be clear to those skilled in the art that although the particular compressor drive means illustrated by the FIGURE utilizes a throttle valve means 21 to control the flow of steam to a turbine 12, the use of similar suitable means such as means to control the flow of fluid to a hydraulic motor, to control the flow of fuel to an internal combustion engine, or to control the flow of electricity to an electrical motor, or other operable means could be used in accordance with the invention to control the speed of the compressor 11.

The position of the throttle valve 21 is adjusted by a speed controller 23 in response to the comparison of a compressor speed signal 24 with a compressor speed set point signal 25. The compressor speed signal 24 is generated by a speed transducer means 26 which can be any suitable speed transducing means such as a tachometer associated with the compressor 11 or turbine 12 or with the rotating drive shaft 13, as illustrated. The speed controller means 23 can be any suitable process controller such as proportional controller or a more sophisticated proportional-integral-derivative controller capable of being tuned to the response characteristics of the turbine 12 or other drive means to provide a compressor speed represented by the compressor speed set point signal 25, viewed in a different manner, a compressor speed sufficient to maintain the compressor speed signal 24 at a value equal to the compressor speed set point signal 25. In many instances the throttle valve 21, speed controller 23 and speed transducer 26 will be provided by the manufacturer as an integral part of the compressor 11 and turbine 12.

The compressor outlet conduit 16 is split by any suitable means such as the illustrated "Y" fitting 31 into a main conduit means 32, usually carrying a major portion of the compressed flow, and a vent conduit means 33, usually carrying a minor portion of the compressed flow. The vent conduit means 33 contains a relief valve means 35 for varying the resistance to flow presented by the vent conduit means 33 in order to provide the desired division of compressed gas from the compressor 11 between the main conduit means 32 and the vent conduit means 33 within the control range of the relief valve means 35. The position of the relief valve means 35 is determined by the output signal 36 of a flow controllable means 37. A flow transducer means 38 associated with flow sensing means 39 located in the main conduit means 32 provides a main conduit flow signal 41 representative of the flow rate of gas through the main conduit means 32. The flow controller means 37 produces its output signal 36 in response to a comparison of the main conduit flow signal 41 and a main conduit flow set point signal 42. The flow controller 37 can be a proportional controller or can be a more sophisticated controller such as a proportional-integral-derivative controller tuned to take into account the response characteristics of the relief valve means 35, the flow sensor 39 and flow transducer 38 or other similar factors in order to provide a flow through the main conduit means 32 equal to the flow represented by the set point signal 42 or, in other terms, to provide a flow through the main conduit means 32 such that the flow signal 41 is equal to the set point signal 42.

Although a separate sensing means could be provided to monitor the position of the relief valve means 35, the position of a relief valve means 35 which exhibits an accurate response to the output signal 36 of the flow controller means 37 can be determined by the magnitude of the valve control signal 36. Accordingly, in accordance with the illustrated preferred embodiment of the invention, a pressure a current transducer 45 is utilized to convert the pneumatic signal 36 to a corresponding electrical signal 46 representative of the position of the relief valve means 35. The relief valve position signal 46 is provided to a compressor acceleration signal generating means 47 along with a maximum valve position set point signal 48 and a minimum valve position set point signal 49. The maximum valve position set point signal 48 is a signal equal to the maximum valve position signal 46 which will be present at a first extreme of the desired operating range of the position of the relief valve means 35. Similarly, the minimum valve position set point signal 49 is a signal equal to the minimum valve position 46 which will be present when the relief valve means 35 is at the opposite end of its desired range of operation. Although the two set point signals 48 and 49 will represent the valve position signal 46 present at opposite ends of a desired range of operation in each case, due to the availability of pneumatically actuated valve means 35 which open or provide less resistance to flow with an increase in applied pneumatic pressure as well as valves which close or provide greater resistance to flow when the actuating pressure is increased, as well as the possibility that various sign changes or signal inversions may be encountered in electrical or electrical/pneumatic interface equipment associated with any particular system, the maximum valve position set point signal 48 can represent either the valve position presenting the most resistance to flow desired during regulatory operation of the valve or the position providing the least resistance of flow desired during regulatory operation of the valve, with the minimum valve position set point signal 49 representing the opposite end of the desired control range in each case. In response to its three input signals, the compressor acceleration signal generating means 47 produces a compressor acceleration signal 51 which satisfies the following conditions:

$$A_c = 0, \ V_{max} \geq V \geq V_{min}$$

$$A_c = (f)(V_{max} - V), \ V > V_{max}$$

$$A_c = (f)(V_{min} - V), \ V < V_{min}$$

where
$A_c$ = Compressor acceleration signal 51,
$V_{max}$ = Maximum valve position set point signal 48,
$V_{min}$ = Minimum valve position set point signal 49, and
$V$ = Valve position signal 46.

The functional relationship between $A_c$ and $(V_{max} - V)$ or $(V_{min} - V)$ as expressed hereinabove can be any relationship suitable for producing a compressor acceleration signal 51 which can be used to control the compressor 11. Such a functional relationship can be a proportional-integral-derivative relationship or other suitable mathematical relationship for providing a compressor acceleration signal 51 which is operable in a particular compressor system or which is specially tuned to the individual response parameters of the particular system.

In the presently preferred embodiment of the compressor acceleration signal generating means 47, a high select relay 52 receives the valve position signal 46 and maximum valve position set point signal 48 as inputs thereto and delivers as a high select output signal 53 equal to the larger of the two signals. A subtracting means 54 produces an output signal 55 representative of the difference between the maximum valve position set point signal 48 and the high select output signal 53. When the valve position signal 46 is less than the set point signal 48, the high select output signal 53 is equal to signal 48 and the output signal 55 from the subtracting means 54 is zero. When the valve position signal 46 exceeds the maximum valve position set point signal 48, the high select output signal 53 is equal to the valve position signal 46 and the output signal 55 of the subtracting means 54 is representative of the value of the set point signal 48 less the value of the valve position signal 46 ($V_{max} - V$). Using the sign conventions illustrated, with the range of possible valve position signals 46 and the set point signals 48 and 49 being positive, a valve position signal 46 greater than the maximum valve position set point signal 48 would result in a negative signal 55 representative of the magnitude of the difference between signals 46 and 48.

In an analogous manner, a low select relay 56 accepts the valve position signal 46 and the minimum valve position set point signal 49 as inputs thereto and delivers a low select output signal 57 equal to the lower of the two input signals. A subtracting means 58 generates an output signal 59 which is representative of the amount by which the minimum valve position set point signal 49 exceeds the low select output signal 57. When the valve position signal 46 is equal to or greater than the set point signal 49, the low select output signal 57 is equal to the set point signal 49 and the output signal 59 from the subtracting means 58 is zero. However, when the valve position signal 46 is less than the minimum valve position set point signal 49, the low select output signal 57 is equal to the valve position signal 46 and, using the same sign conventions discussed hereinabove, the output signal 59 from the subtracting means 58 is a negative signal representative of the magnitude of the difference between the minimum valve position set point signal 49 and the valve position 46 ($V_{min} - V$).

An adding means 61, utilizing the output signals 55 and 59 of their respective subtracting means 54 and 58 as inputs thereto produces a valve deviation signal 60 which is representative of the sum of signals 55 and 59. When the value of the valve position signal 46 is between the values of set point signals 48 and 49 or equal to either of the set point signals 48 or 49, both signals 55 and 59 will be zero and the valve deviation signal 60 will also be zero. When the valve position signal 46 exceeds the set point signal 48, it will, by definition, also be greater than set point signal 49 with the result that signal 55 will be a negative signal equal in magnitude to the difference between signals 46 and 48 and signal 59 will be zero, and the resulting valve deviation signal 60 will be a negative signal equal in magnitude to the difference between signals 46 and 48. When the valve position signal 46 is less than the set point signal 49, it will also be less than the set point signal 48, signal 55 will be zero, signal 59 will be a positive signal equal in magnitude to the difference between signals 46 and 49, and the resulting valve deviation signal 60 will be a positive signal equal in magnitude to the difference between signals 46 and 49. Since the magnitude of the difference between signals 46 and 48 when signal 46 exceeds set point signal 48 and the magnitude of the difference between signals 46 and 49 when signal 46 is smaller than signal 49 are representative of the amounts by which the position of the relief valve 35 has departed from a desired control range, the valve deviation signal 51 is representative of the sign and magnitude of the variation of the relief valve means 35 from its desired control range as represented by the set point signals 48 and 49.

Although the valve deviation signal 60 can be translated into a suitable compressor acceleration signal 51 by any suitable means, the illustrated presently preferred embodiment of the invention utilizes a zero set point proportional-integral-derivative acceleration controller 50 to perform such a translation. The output compressor acceleration signal 51 of the preferred acceleration controller 50 can be defined as:

$$A_c = K_1 E + K_2 E/dt + K_3 \int E dt$$

where
$A_c$ = Compressor acceleration signal 51
$K_1, K_2, K_3$ = constants,
$E = D_v - SP$,
$D_v$ = Valve deviation signal 60, and
SP = Acceleration controller set point = 0.

Since the acceleration controller set point is zero, the response of the acceleration controller becomes:

$$A_c = K_1 D_v + K_2 dD_v/dt + K_3 \int D_v dt$$

where $A_c$, $D_v$, $K_1$, $K_2$ and $K_3$ are as defined above. The constants $K_1$, $K_2$ and $K_3$ can be tuned to provide a suitable or optimum compressor acceleration signal adapted to the response characteristics of the particular compressor system. It should be noted that, like the valve deviation signal 60, the compressor acceleration is zero when the valve position signal 46 is between the valves of set point signals 48 and 49 or equal to either of the set point signals 48 or 49. When the valve position signal exceeds signal 48 or is less than signal 49 the compressor acceleration signal 51 will be responsive to the sign and magnitude of the variation of the relief valve means 35 from its desired control position range.

For control of compressors in systems where the configuration of the overall system precludes the generation of a compressor acceleration signal 51 representing a desired acceleration or deceleration to which the compressor or compressor drive means is incapable of responding, limitation or modification of the compressor acceleration 51 will not be necessary. In systems where the compressor acceleration signal 51 which is capable of being generated can exceed the ability of the compressor and its drive means to respond, however, and as an added precautionary measure in any system, apparatus for maintaining the compressor acceleration signal 51 within preselected positive and negative limits, as illustrated by the FIGURE, is presently preferred. In the particular configuration illustrated, an acceleration limit set point signal 62 representative of the maximum positive value of the compressor acceleration signal 51 which can be accepted is provided to a low select relay 63 which delivers an output signal 65 equal to the lower of signals 51 and 62. The output signal 65 provided by the low select relay 63 is therefore effectively limited to a value equal to or less than to the positive value of the set point signal 62. When the maximum acceleration and maximum deceleration which can be safely tolerated by the system are equal, the set point signal 62 can be inverted by any suitable means such as an inverting amplifier 67 to provide a negative acceleration set point signal 68. A high select relay 69 receives as inputs thereto the output signal 65 from the low select relay 63 and the negative acceleration set point signal 68 and delivers an output signal 71 which is the higher of the two input signals. The signal 71 will therefore be equal to the compressor acceleration signal 51 except when the compressor acceleration signal 51 exceeds the acceleration set point signal 62 or is less than the negative compressor acceleration set point signal 68. When the compressor acceleration signal 51 is larger than the set point signal 62, the set point signal 62 will be provided as signal 71. When the compressor acceleration signal 51 is less than the negative acceleration set point signal 68, the set point signal 68 will be provided as the signal 71. When the maximum allowable rate of speed change or acceleration for the compressor system is not the same for a positive increase in speed or acceleration as it is for a negative increase in speed or deceleration, independent appropriate set point signals 62 and 68 can be supplied.

The limited compressor acceleration signal 71 or, in appropriate cases, the acceleration set point signal 51, it is provided as an input to an integrator or integrating amplifier means 72 which delivers a speed signal 73 in response to integrating the signal 71. The relationship between signal 71 and 73 can be described as $$S_c = (f) \int A_{cl} dt$$

where
  $S_c$ = Speed signal 73
  $A_{cl}$ = Limited compressor acceleration signal 71
  t = Time Unless some tuning is required to accommodate the characteristics of the individual system components, to provide scaling necessary for later signal conversion or zero suppression, to provide an appropriate sign change, or to perform some similar function the use of an integrating amplifier means 72 exhibiting the general characteristic $$S_c = \int A_{cl} dt,$$

where $S_c$, $A_{cl}$ and t are as defined above, is preferred.

In systems where the maximum and minimum speed signals 73 which can be generated will not correspond to compressor speeds above or below the operable speeds of the compressor system, the compressor speed signal 73 can be converted directly into a compressor speed set point signal 25 for controlling the speed of the turbine 12 or other drive means associated with the compressor. However, in systems where variations in process air demands or other variable factors can result in the generation of a speed signal 73 which would cause operation of the compressor or its associated drive means at a speed higher or lower than a desired operating range, and as a safety precaution for any system, a low limit relay 75 and a high limit relay 77 having associated therewith a respective low limit set point signal 76 and high limit set point signal 78 are used to maintain a limited speed signal 79 which is equal to the speed signal 73 when the value of that signal does not fall below the low limit set point signal 76 and does not exceed the high limit set point signal 78. When the speed signal 73 is lower than the low limit set point signal 76, the low limit relay 75 will deliver an output signal 74 equal to the set point signal 76. When the speed signal 73 is higher than the high limit set point signal 78, the signal 74 will be equal to the speed signal 73, but the high limit relay 77 will deliver an output signal 79 equal to the high limit set point signal 78.

A current to pressure transducer means 81 or other suitable means for use with a particular system converts the limited speed signal 79 to a compressor speed set point signal 25 representative of the desired compressor speed to maintain the output of the compressor 11 within the control range of the relief valve means 35.

Specific components which can be used in the practice of the invention as illustrated by the presently preferred embodiment of the FIGURE are as follows:

| | |
|---|---|
| Throttle valve 21 | Stabilflo Valve No. A218 |
| | Foxboro Co. |
| | Foxboro, Mass. |
| Speed controller 23 | Model 1412 RA51000 |
| | Taylor Instrument Co. |
| | Rochester, N.Y. |
| Speed transducer 26 | Model GC 774 CE/P |
| | Moore Products Co. |
| Relief valve 35 | Spring House, Pa. |
| | No. A240 |
| | Foxboro Co. |
| | Foxboro, Mass. |
| Flow controller 37 | Model 1412 RA51000 |
| | Taylor Instrument Co. |
| | Rochester, N.Y. |
| Flow transducer 38 | No. A94 Air Operated Differential pressure cell |
| | Foxboro Co. |
| | Foxboro, Mass. |
| Flow sensor 39 | A78 orifice plate and flange union |
| | Foxboro Co. |
| | Foxboro, Mass. |
| Pressure-current transducer 45 | Bronze Bellows A61 |
| | Foxboro Co. |
| | Foxboro, Mass. |
| High select relays 52 and 69 | No. B05885 Multi-use Amp. |
| | Applied Automation Inc. |
| | Bartlesville, Ok. |
| Subtracting means 54 and 58 | No. B05885 Multi-use Amp. |
| | Applied Automation Inc. |
| | Bartlesville, Ok. |
| Low select relays 56 and 63 | No. B05885 Multi-use Amp. |
| | Applied Automation Inc. |
| | Bartlesville, Ok. |
| Acceleration Controller 50 | Model M551C1131 |
| | Veritrak Indicating Controller |
| | Westinghouse Electric Corp. |
| | Houston, Texas |
| Adder 61 | No. B05885 Multi-use Amp |
| | Applied Automation Inc. |
| | Bartlesville, Ok. |
| Inverter 67 | No. B05885 Multi-use Amp |
| | Applied Automation Inc. |
| | Bartlesville, Ok. |
| Integrator 72 | No. B05885 Multi-use Amp |
| | Applied Automation Inc. |
| | Bartlesville, Ok. |
| Low limit relay 75 | No. B03993 |
| | Applied Automation Inc. |
| | Bartlesville. Ok. |
| High limit relay 77 | No. B03993 |
| | Applied Automation Inc. |
| | Bartlesville, Ok. |
| Current to pressure transducer 81 | Moore Products Co., Spring House Pa., Mfr. Stock No. T49003 |
| | Applied Automation Inc. |
| | Bartlesville, Ok. |

In addition to providing responsive compressor operation wherein a variable flow set point signal 42 is provided by other control equipment such as a process controller, computer, or other similar automatic equipment, the apparatus and method of the invention are useful for providing an orderly change in compressor operating speed when the flow set point signal 42 is manually changed from one value to another. The apparatus and method of the invention are also advantageous in providing for automatic response to long range changes in operating characteristics of the compressor 11, turbine 12 or other associated drive means.

The preferred method and apparatus of the invention illustrated by the FIGURE and described hereinabove are particularly well adapted for control of an air compressor supplying air to an ammonia synthesis process. The compressor is operated to supply slightly more air than can be used by the process, and the amount of air delivered to the process is controlled by manipulating the vent flow. In accordance with the invention, the compressor speed is adjusted to maintain the vent valve in control range.

Although the presently preferred embodiment of the invention uses electrical analog acceleration signal and speed signal generating means interfaced with pneumatic sensing and control elements, the method and apparatus of the invention are equally applicable to systems using mechanical, electrical analog, digital electronic, pneumatic, hydraulic or other suitable means or various combinations of such means for acceleration and speed signal generation and for sensing and control means. In locations having access to a digital computer, for example, the acceleration signal generation and limitation as well as the speed signal generation and limitation of the preferred embodiment could readily be implemented by means of a software or hardware programmed digital device.

While the compressor acceleration signal generating means 47 of the presently preferred embodiment has been described herein, use of other suitable signal generating means including a dead-band controller such as those available from various manufacturers such as Westinghouse Electric Corporation as the generating means 47 or use of a diode function generator as the generating means 47 or use of other similar apparatus capable of providing a compressor acceleration signal as described herein is within the scope of the invention.

Although the presently preferred embodiment of the method and apparatus of the invention illustrated by the figure uses a combination of pneumatic and electrical analog signals with appropriate interface equipment, any combination of pneumatic, electrical analog, digital electronic, hydraulic, mechanical, or other similar means for transmitting information can be used in implementing the apparatus and method of the invention. Likewise, numerous other variations and modifications can be made by those skilled in the art without departing from the scope of the invention and the appended claims thereto.

We claim:

1. Apparatus comprising:
   means for controlling the speed of a compressor means in response to a speed set point signal to provide a compressor speed corresponding to the value of said speed set point signal;
   means for dividing the flow of compressed gas from said compressor means into a main stream within a main conduit means and a vent stream within a vent conduit means;
   means for automatically controlling the flow of gas through said main conduit means by varying the resistance to flow of a flow restriction means associated with said vent conduit means;
   means for sensing the position of said flow restriction means and for producing a restriction signal representative thereof;
   means for generating a compressor acceleration signal in response to said restriction signal being representative of a position of said flow restriction means outside a preselected position range; and
   means for generating said compressor speed set point signal in response to said compressor acceleration signal.

2. Apparatus in accordance with claim 1 wherein said means for generating said compressor speed set point signal comprises means for integrating said compressor acceleration signal.

3. Apparatus in accordance with claim 1 wherein said means for generating said compressor acceleration signal comprises means for comparing the position of said flow restriction means with a preselected position range and delivering a signal responsive to the magnitude and direction of departure from said preselected position range.

4. Apparatus in accordance with claim 3 wherein said means for generating said compressor acceleration signal comprises means for accepting said restriction signal, a first restriction set point signal representative of a preselected minimum flow restriction at which operation of said flow restrictive means is desired, and a second restriction set point signal representative of a preselected maximum flow restriction at which operation of said flow restriction means is desired, and delivering in response thereto a compressor acceleration signal responsive to the amount by which the flow restriction provided by said flow restriction means exceeds said preselected maximum flow restriction or is exceeded by said preselected minimum flow restriction.

5. Apparatus in accordance with claim 4 wherein said means for generating said compressor speed set point signal comprises means for integrating said compressor acceleration signal.

6. Apparatus in accordance with claim 5 additionally comprising means for maintaining said compressor acceleration signal within preselected positive and negative limits.

7. Apparatus in accordance with claim 6 additionally comprising means for maintaining said compressor speed set point signal within preselected upper and lower limits.

8. Apparatus in accordance with claim 7 additionally comprising a compressor means and a compressor drive means, wherein said means for controlling said compressor means comprises means for regulating the speed of said compressor drive means.

9. A method for controlling the flow of gas from a compressor, said method comprising:
   dividing the flow of compressed gas from said compressor into a main stream within a main conduit means and a vent stream within a vent conduit means;
   automatically venting a portion of the gas from said compressor through a pressure relief means, located in said vent conduit means, in response to a signal which is responsive to the flow rate of gas through said main conduit means to provide a desired flow rate of gas through said main conduit means fed by said compressor; and
   automatically controlling the speed of said compressor in response to a signal which is respondive to the position of said pressure relief means to maintain the compressor output within the operable control range of said pressure relief means.

10. A method in accordance with claim 9 additionally comprising:
    compressing a gas for use in a process, and
    providing a major portion of said flow of gas from said compressor to said process;
    wherein said step of automatically venting a portion of the gas from said compressor comprises venting a minor portion of said flow of gas from the output of said compressor.

11. A method for controlling the flow of gas from a compressor, said method comprising:
    automatically venting a portion of the gas from said compressor through a pressure relief means to provide a desired flow rate of gas through a main conduit fed by said compressor; and
    automatically controlling the speed of said compressor to maintain the compressor output within the operable control range of said pressure relief means;

wherein automatically controlling the speed of said compressor comprises:

generating a compressor acceleration signal responsive to the magnitude and direction by which the position of said pressure relief means departs from a preselected operating range;

generating a compressor speed set point signal in response to said compressor acceleration signal; and controlling the speed of said compressor in response to said compressor speed set point signal.

12. A method in accordance with claim 11 wherein generating said compressor speed set point signal comprises integrating said compressor acceleration signal.

13. A method in accordance with claim 11 wherein generating said compressor acceleration signal comprises delivering, in response to a relief position signal representative of the position of said relief means, a first relief position set point signal representative of the maximum desired open position of said relief means, and a second relief position set point signal representative of the minimum desired open position of said relief means, a compressor acceleration signal responsive to the amount by which the position of said relief means exceeds the maximum desired open position represented by said first relief position set point signal or is exceeded by the minimum desired open position represented by said second relief position set point signal.

14. A method in accordance with claim 13 wherein generating said compressor speed set point signal comprises integrating said compressor acceleration signal.

15. A method in accordance with claim 14 additionally comprising maintaining said compressor acceleration signal within preselected positive and negative limits.

16. A method in accordance with claim 15 additionally comprising maintaining said compressor speed set point signal within preselected upper and lower limits.

* * * * *